United States Patent Office 3,826,639
Patented July 30, 1974

3,826,639
AGENT FOR KEEPING CUT FLOWERS FRESH
Ernst-Heinrich Pommer, Limburgerhof, and Hannelore Will, Ludwigshafen, Germany, assignors to Badische Anilin- & Soda-Fabrik Aktiengesellschaft, Ludwigshafen (Rhine), Germany
No Drawing. Filed Feb. 4, 1972, Ser. No. 223,758
Int. Cl. A01n 3/02
U.S. Cl. 71—68                                     10 Claims

ABSTRACT OF THE DISCLOSURE

Agent for keeping cut flowers or other plant parts fresh which contains, in addition to conventional ingredients, a chlorocholine salt, citric acid, a silver salt and a salt of N-nitroso-N-cyclohexylhydroxylamine, and a process for keeping cut flowers fresh with this agent.

---

The present invention relates to an agent for keeping cut flowers or other plant parts fresh which contains a chlorocholine salt, citric acid, a silver salt and a salt of N-nitroso-N-cyclohexylhydroxylamine.

It is known to preserve the freshness of cut flowers by adding a preservative to the water in which the flowers stand. Such mixtures contain for instance a mixture of sugar and sugar derivatives, a pH stabilizer, e.g., an organic carboxylic acid having a low molecular weight, and a microbicide (German Printed Application DOS 1,542,-832). However the action of these conventional agents is unsatisfactory.

We have now found that the disadvantages of these known agents may be avoided if they contain a chlorocholine salt, citric acid, a silver salt and a salt of N-nitroso-N-cyclohexylhydroxylamine. By "chlorocholine salts," we means quite generally salts of chlorocholine (N-trimethyl - N - 2-chloroethylammonium salts) with acids, e.g., hydrochloric acid, hydrobromic acid, sulfuric acid, phosphoric acetic acid and propionic acid. Chorocholine chloride is preferred because it is easily accessible and is already used in large amounts in agriculture.

By "silver salts" we mean generally the water-soluble salts of silver with inorganic or organic acids, e.g., nitric acid and acetic acid. Silver nitrate is preferred because it is easily accessible industrially.

By "salts of N-nitroso-N-cyclohexylhydroxylamine" we mean generally the alkali metal and alkaline earth metal salts. It is preferred to use the sodium salt, the calcium salt or mixtures of these two salts.

The process according to the invention for preserving cut flowers consists in adding the abovementioned preservative to the water in which the cut flowers stand and finely distributing it therein. An aqueous solution is obtained in which the freshness of cut flowers is preserved over a long period of time.

The good action of the preservatives according to the invention is attributable to the presence of chlorocholine salts, citric acid, a silver salts and a salt of N-nitroso-N-cyclohexylhydroxylamine; the chlorocholine salts are used in an amount of from 0.012 to 0.004% by weight; citric acid in amount of from 0.06 to 0.02% by weight; the silver salt in an amount of from 0.00024 to 0.00008% by weight; and the salt of N-nitroso-N-cyclohexylhydroxylamine in an amount of from 0.003 to 0.001% by weight, with reference to the water in which the cut flowers stand. The agents according to the invention also contain substances which are contained in conventional preservatives, e.g., sugar or sugar derivatives, particularly cane sugar and dextrose, and which are used in amounts, with reference to the water in which the flowers stand, of from 1 to 3% by weight. The agents according to the invention may additionally contain microbicidal compounds, e.g., N-alkyl (alkyl radical of 12 to 14 carbon atoms) -N,N-dimethyl-N-benzylammonium chloride, 1,3-bis(p-isobutylbenzyl)-imidazolium chloride, phenylmercuric acetate, Agri-mycin, potassium sorbate and mixtures of these compounds, in amounts of from 0.02 to 0.0001% by weight with reference to the water in which the cut flowers stand. By adding the preservative to the water in which the flowers stand and finely dispersing it therein an aqueous solution is obtained which prevents premature wilting of the flowers. The agent according to the invention itself contains the individual substances in concentrated form and is converted into the aqueous solution which preserves the cut flowers by dilution with water, approximately in the ratio of concentrate to water of from 1:20 to 1:50 parts by weight. The following compositions demonstrate the abovementioned advantageous properties.

| Composition | Components | Concentration in wt. percent in the water |
|---|---|---|
| 1 | Cane sugar | 1.5 |
|   | Citric acid | 0.03 |
|   | Chloroethyltrimethylammonium chloride | 0.006 |
|   | N-nitroso-N-cyclohexylhydroxylamine, sodium salt | 0.0015 |
|   | Silver nitrate | 0.00012 |
| 2 | Cane sugar | 1.5 |
|   | Citric acid | 0.03 |
|   | Chloroethyltrimethylammonium chloride | 0.006 |
|   | N-nitroso-N-cyclohexylhydroxylamine, calcium salt | 0.0015 |
|   | Silver nitrate | 0.00012 |
| 3 | Cane sugar | 1.5 |
|   | Citric acid | 0.03 |
|   | Chloroethyltrimethylammonium chloride | 0.006 |
|   | N-nitroso-N-cyclohexylhydroxylamine, sodium salt | 0.001 |
|   | N-nitroso-N-cyclohexylhydroxylamine, calcium salt | 0.001 |
|   | Silver nitrate | 0.00012 |
| 4 | Glucose | 2.0 |
|   | Citric acid | 0.02 |
|   | Chlorocholine chloride | 0.004 |
|   | N-nitroso-N-cyclohexylhydroxylamine, sodium salt | 0.0015 |
|   | N-nitroso-N-cyclohexylhydroxylamine, calcium salt | 0.0015 |
|   | Silver nitrate | 0.00012 |
|   | 1,3-bis-(p-isobutylbenzyl)-imidazolium chloride | 0.003 |
| 5 | Cane sugar | 1.0 |
|   | Citric acid | 0.03 |
|   | Chlorocholine chloride | 0.006 |
|   | N-nitroso-N-cyclohexylhydroxylamine, calcium salt | 0.0015 |
|   | Silver nitrate | 0.00012 |
| 6 | Cane sugar | 3.0 |
|   | Citric acid | 0.04 |
|   | Chlorocholine chloride | 0.012 |
|   | N-nitroso-N-cyclohexylhydroxylamine, calcium salt | 0.0015 |
|   | Silver nitrate | 0.00024 |
| 7 | Cane sugar | 1.5 |
|   | Citric acid | 0.03 |
|   | Chlorocholine chloride | 0.004 |
|   | N-nitroso-N-cyclohexylhydroxylamine, sodium salt | 0.003 |
|   | Silver nitrate | 0.00008 |
| 8 | Cane sugar | 1.5 |
|   | Citric acid | 0.03 |
|   | Chlorocholine chloride | 0.005 |
|   | N-nitroso-N-cyclohexylhydroxylamine, sodium salt | 0.0015 |
|   | Silver nitrate | 0.00008 |
|   | 1,3-bis-(p-isobutylbenzyl)-imidazolium chloride | 0.002 |
| 9 | Glucose | 1.0 |
|   | Citric acid | 0.06 |
|   | Chlorocholine chloride | 0.008 |
|   | N-nitroso-N-cyclohexylhydroxylamine, sodium salt | 0.001 |
|   | Silver nitrate | 0.00012 |

TABLE—Continued

| Composition | Components | Concentration in wt. percent in the water |
|---|---|---|
| 10 | Glucose | 1.5 |
|  | Citric acid | 0.04 |
|  | Chlorocholine chloride | 0.004 |
|  | N-nitroso-N-cyclohexylhydroxylamine, sodium salt | 0.003 |
|  | Silver nitrate | 0.00016 |
| 11 | Cane sugar | 2.0 |
|  | Glucose | 1.0 |
|  | Citric acid | 0.03 |
|  | Chlorocholine chloride | 0.004 |
|  | N-nitroso-N-cyclohexylhydroxylamine, sodium salt | 0.0015 |
|  | Silver nitrate | 0.00012 |
| 12 | Cane sugar | 1.5 |
|  | Citric acid | 0.02 |
|  | Chlorocholine chloride | 0.004 |
|  | N-nitroso-N-cyclohexylhydroxylamine, sodium salt | 0.0015 |
|  | Silver acetate | 0.00012 |

The good preservative properties of the compositions according to the invention are illustrated in the following examples.

EXAMPLE 1

10 cut greenhouse carnations are placed, at 20° to 22° C., in glass vessels containing 500 ml. of water in which the substances listed in the compositions have been dissolved before commencement of the experiment. As controls, there are used tap water and a mixture of cane sugar, citric acid and alkyldimethylbenzylammonium chloride. After 8 and 14 days the carnations which are still fresh are counted.

|  | Number of fresh carnations after— | |
|---|---|---|
|  | 8 days | 14 days |
| Composition: | | |
| 1 | 10 | 10 |
| 2 | 10 | 10 |
| 3 | 10 | 9 |
| 4 | 10 | 8 |
| 5 | 10 | 8 |
| 6 | 10 | 10 |
| 7 | 10 | 9 |
| 8 | 10 | 10 |
| 9 | 10 | 8 |
| 10 | 10 | 8 |
| 11 | 10 | 9 |
| 12 | 10 | 10 |
| Comparative agent: cane sugar 1.35%; citric acid 0.15%; N-alkyl-N,N-dimethylbenzylammonium chloride 0.01% | 9 | 4 |
| Tap water (control) | 3 | 0 |

EXAMPLE 2

The procedure of Example 1 is adopted with the exception that 10 cut roses of the Super Star variety are used. The number of fresh roses is determined after 2, 4, and 5 days.

|  | Number of fresh roses after— | | |
|---|---|---|---|
|  | 2 days | 4 days | 5 days |
| Composition: | | | |
| 1 | 10 | 10 | 9 |
| 2 | 10 | 10 | 10 |
| 4 | 10 | 9 | 9 |
| 7 | 10 | 9 | 9 |
| 8 | 10 | 8 | 7 |
| 11 | 10 | 10 | 8 |
| Comparative agent: cane sugar 1.35%; citric acid 0.15%; N-alkyl-N,N-dimethylbenzylammonium chloride 0.01% | 10 | 2 | 0 |
| Tap water (control) | 6 | 0 | 0 |

We claim:

1. A composition for preserving the freshness of a cut flower which comprises:
   (a) 4 to 12 parts by weight of the chlorocholine salt of an acid selected from the group consisting of hydrochloric acid, hydrobromic acid, sulfuric acid, phosphoric acid, acetic acid and propionic acid;
   (b) 20 to 60 parts by weight of citric acid;
   (c) 0.08 to 0.24 parts by weight of a silver nitrate;
   (d) 1 to 3 parts by weight of a compound selected from the class consisting of the alkali metal and alkaline earth metal salts of N-nitroso-N-cyclohexylhydroxylamine; and
   (e) 1,000 to 3,000 parts by weight of a sugar.

2. A composition as claimed in Claim 1 wherein component (a) is chlorocholine chloride.

3. A composition as claimed in Claim 1 containing as component (f) at least 0.1 parts by weight of a microbiocidal compound which is selected from the class consisting of N-alkyl-N,N-dimethyl-N-benzylammonium chloride of 12 to 14 carbon atoms in the alkyl radical, 1,3-bis-(p-isobutylbenzyl)-imidazolium chloride, phenylmercuric acetate, Agri-mycin, potassium sorbate and mixtures thereof.

4. A composition as claimed in Claim 1 wherein component (d) is selected from the class consisting of the sodium and calcium salts of said N-nitroso-N-cyclohexylhydroxylamine and mixtures thereof.

5. A composition as claimed in Claim 1 dissolved as a concentrate in about 2,000 to 5,000 parts by weight of water.

6. A composition as claimed in Claim 5 diluted with water in a ratio of 1:20 to 1:50 parts by weight.

7. A process for preserving the freshness of a cut flower which comprises placing the cut flower in an aqueous solution in which there is dissolved with reference to the water:
   (a) 0.004 to 0.012% by wt. of a chlorocholine salt;
   (b) 0.02 to 0.06% by wt. of a citric acid;
   (c) 0.00008 to 0.00024% by wt. of a water-soluble silver salt;
   (d) 0.001 to 0.003% by wt. of a compound selected from the class consisting of the alkali metal and alkaline earth metal salts of N-nitroso-N-cyclohexyihydroxylamine;
   (e) 1 to 3% by wt. of a sugar; and
   (f) 0 to 0.02% by wt. of a microbiocidal compound.

8. A process as claimed in Claim 7 wherein component (a) is chlorocholine chloride.

9. A process as claimed in Claim 8 wherein component (d) is a compound selected from the class consisting of the sodium and calcium salts of N-nitroso-N-cyclohexylhydroxylamine and mixtures thereof.

10. A process as claimed in Claim 9 wherein component (c) is silver nitrate.

References Cited

UNITED STATES PATENTS

| 2,805,137 | 9/1957 | Clopton | 71—68 |
| 2,923,094 | 2/1960 | Ryan | 71—78 |
| 3,395,009 | 7/1968 | Oettel | 71—121 |

FOREIGN PATENTS

| 1,088,681 | 3/1955 | France | 71—121 |

JAMES O. THOMAS, Jr., Primary Examiner

UNITED STATES PATENT OFFICE
CERTIFICATE OF CORRECTION

PATENT NO. : 3,826,639
DATED : July 30, 1974
INVENTOR(S) : Ernst-Heinrich Pommer et al.

It is certified that error appears in the above-identified patent and that said Letters Patent are hereby corrected as shown below:

In Column 1, after Line 7, insert "Claims priority, application Germany, February 16, 1971, P 21 07 298.0"

In Column 1, Line 38, delete "phosphoric acetic acid" and substitute --phosphoric acid, acetic acid...--

In Column 2, Line 3, delete "bis(p-isobutylbenzyl)-" and substitute -- bis-(p-isobutylbenzyl)- --

Signed and Sealed this twenty-second Day of June 1976

[SEAL]

Attest:

RUTH C. MASON
Attesting Officer

C. MARSHALL DANN
Commissioner of Patents and Trademarks